(12) United States Patent
Hamann et al.

(10) Patent No.: US 11,567,798 B2
(45) Date of Patent: Jan. 31, 2023

(54) METHOD AND APPARATUS FOR MANAGING COMPUTING PERFORMANCE IN A DATA PROCESSING SYSTEM

(71) Applicant: Robert Bosch GmbH, Stuttgart (DE)

(72) Inventors: Arne Hamann, Ludwigsburg (DE); Dirk Ziegenbein, Freiberg am Neckar (DE); Eckart Mayer-John, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 16/896,867

(22) Filed: Jun. 9, 2020

(65) Prior Publication Data

US 2021/0026691 A1    Jan. 28, 2021

(30) Foreign Application Priority Data

Jul. 26, 2019    (DE) .......................... 102019211173.4

(51) Int. Cl.
*G06F 9/46*    (2006.01)
*G06F 9/50*    (2006.01)

(52) U.S. Cl.
CPC ..................... *G06F 9/50* (2013.01)

(58) Field of Classification Search
CPC ....................................................... G06F 9/50
USPC ........................................................ 718/104
See application file for complete search history.

(56) References Cited

U.S. PATENT DOCUMENTS

| 7,703,082 | B2* | 4/2010 | Andrews | G06F 9/4812 717/130 |
| 9,240,025 | B1* | 1/2016 | Ward, Jr. | G06Q 30/08 |
| 10,572,412 | B1* | 2/2020 | Ward, Jr. | G06F 9/48 |
| 10,992,517 | B1* | 4/2021 | Watson | H04L 41/0668 |
| 2003/0101084 | A1* | 5/2003 | Otero Perez | G06F 9/4881 705/30 |
| 2005/0065902 | A1* | 3/2005 | De Givry | G06F 30/00 706/45 |
| 2006/0193074 | A1* | 8/2006 | Williams | G06F 3/0659 360/75 |
| 2008/0040190 | A1* | 2/2008 | Khosla | G06Q 10/06312 705/7.22 |
| 2015/0268978 | A1* | 9/2015 | Vu | G06F 9/545 718/1 |
| 2018/0129529 | A1* | 5/2018 | Boenig, II | G06F 11/3442 |

(Continued)

*Primary Examiner* — Mehran Kamran
(74) *Attorney, Agent, or Firm* — Norton Rose Fulbright US LLP; Gerard Messina (57) ABSTRACT

A method for managing computing performance in a real-time data processing system, having at least one apparatus for controlling at least one computing device that is embodied for execution of a first and of at least one further application, at least the first application encompassing at least one anytime algorithm. The method includes: assigning a first computing-performance budget, as a function of a first point in time, to the first application; activating the computing device for execution of the first application, at the first point in time by the computing device; checking whether, after execution of the first application, a portion of the first computing-performance budget is still available and, in the event a portion of the budget is still available, performing (i) activating the computing device for re-execution of the first application, or (ii) assigning the portion of the first computing-performance budget to at least one further application.

16 Claims, 3 Drawing Sheets

(56) References Cited

U.S. PATENT DOCUMENTS

| | | | |
|---|---|---|---|
| 2019/0034222 A1* | 1/2019 | Choi | G06F 9/48 |
| 2019/0047581 A1* | 2/2019 | Bai | G06F 9/5055 |
| 2019/0095250 A1* | 3/2019 | Qiang | G06F 9/5005 |
| 2020/0026564 A1* | 1/2020 | Bahramshahry | G06Q 10/06316 |
| 2020/0159587 A1* | 5/2020 | Li | G06F 9/4881 |
| 2020/0396230 A1* | 12/2020 | Liu | H04L 63/1441 |
| 2022/0180212 A1* | 6/2022 | Dadkhahi | G06N 5/003 |

\* cited by examiner

METHOD AND APPARATUS FOR MANAGING COMPUTING PERFORMANCE IN A DATA PROCESSING SYSTEM

CROSS REFERENCE

The present application claims the benefit under 35 U.S.C. § 119 of German Patent Application No. DE 102019211173.4 filed on Jul. 26, 2019, which is expressly incorporated herein by reference in its entirety.

BACKGROUND INFORMATION

In real-time systems, it is particularly important that a process or an application be executed within a predefined time span, in particular regardless of the processor architecture being used, in particular in order to ensure functionality of the system and, if applicable, quality of function.

Anytime applications, in particular anytime algorithms, represent a class of algorithms whose use is becoming more and more significant, especially in embedded (real-time) systems and in cyberphysical systems, in particular with regard to open source, and in approaches in the fields of intelligent decision-making and highly developed control and regulation systems, for instance model-predictive control. The term "anytime" application or algorithm is based on the property of the application or algorithm of being able to supply a result at any time, in particular during execution, especially after being executed at least once. The time available is not necessarily known to the application or algorithm; it calculates an initial result, and improves it as long as additional computing time is available. If execution is interrupted, the application or algorithm returns the best result that was obtained up to that point in time. This fundamental property advantageously makes possible a balance between quality of service (QoS) and the execution time of the application or algorithm.

SUMMARY

Preferred embodiments of the present invention include an example method for managing computing performance in a data processing system, in particular in a real-time data processing system, having at least one apparatus for controlling at least one computing device that is embodied for execution of a first and of at least one further application, at least the first application encompassing at least one anytime algorithm, the method encompassing the following steps:
  assigning a first computing-performance budget, as a function of a first point in time, to the first application;
  activating the computing device for execution of the first application, in particular of the anytime algorithm of the first application, at the first point in time by the computing device;
  checking whether, after execution of the first application, a portion of the first computing-performance budget is still available and, in the event a portion of the budget is still available, performing one of the following steps:
  activating the computing device for re-execution of the first application, in particular of the anytime algorithm of the first application; or assigning the portion of the first computing-performance budget to at least one further application.

In further preferred embodiments of the present invention, the step of assigning the portion of the first computing-performance budget to a further application further encompasses: releasing that portion of the first computing-performance budget which is still available after execution of the first application.

In further preferred embodiments of the present invention, the step of checking whether, after execution of the first application, a portion of the first computing-performance budget is still available further encompasses: querying whether and/or how much of the first computing-performance budget is still available.

In further preferred embodiments of the present invention, provision is made that the activation of the computing device for re-execution of the first application, in particular of the anytime algorithm of the first application, is accomplished depending on the still-available portion of the first computing-performance budget and/or depending on a quality of a result of the first application, in particular of the anytime algorithm of the first application; and the activation of the computing device for re-execution is accomplished in particular if the still-available portion of the first computing-performance budget is sufficient to re-perform the first application, in particular the anytime algorithm of the first application, and/or if the quality of the result of the first application, in particular of the anytime algorithm of the first application, has not yet reached a threshold value.

In further preferred embodiments of the present invention, provision is made, if the still-available portion of the first computing-performance budget is not sufficient to perform, in particular to re-perform, the first application, in particular the anytime algorithm of the first application, to activate the computing device to execute a fallback algorithm. A fallback algorithm is, for example, an algorithm that requires comparatively little computing performance but supplies a result that can afford at minimum an at least necessary functionality of the application.

In further preferred embodiments of the present invention, provision is made that the step of assigning the portion of the first computing-performance budget to a further application, and/or the step of releasing that portion of the first computing-performance budget which is still available after execution of the first application, is accomplished depending on a quality of a result of the first application, in particular of the anytime algorithm of the first application, and/or depending on the still-available portion of the first computing-performance budget; and the assigning and/or releasing is accomplished in particular if the quality of the result of the first application, in particular of the anytime algorithm of the first application, has reached or exceeded a threshold value, and/or if the still-available portion of the first computing-performance budget is not sufficient to re-perform the first application, in particular the anytime algorithm of the first application.

In further preferred embodiments of the present invention, provision is made that the step of assigning the first computing-performance budget, as a function of the first point in time, to the first application further encompasses: assigning at least one further computing-performance budget, as a function of a further point in time, to at least one further application, the assigning step being, in particular periodically, repeated.

In further preferred embodiments of the present invention, provision is made that the step of assigning the first computing-performance budget and/or the further computing-performance budget, as a function of a first and/or of the further point in time, to the first and/or to the further application is accomplished using at least one scheduling algorithm, in particular a reservation-based scheduling algorithm, a priority-based scheduling algorithm, a time-based scheduling algorithm.

In further preferred embodiments of the present invention, provision is made that the method further encompasses: a requesting of computing performance, in particular of computing-performance budget, by an application.

In further preferred embodiments of the present invention, provision is made that the method further encompasses: assigning computing-performance budget to the application that has requested computing performance if computing performance is available, in particular is not assigned to a further application. For example, a so-called capacity sharing (CASH) algorithm can be used to assign, in particular to redistribute, computing performance in conjunction with reservation-based methods.

In further preferred embodiments of the present invention, provision is made that the method further encompasses: a querying of an actual time by an application and/or a transferring of an actual time to an application.

In further preferred embodiments of the present invention, provision is made that at least one step of the method is performed by the first and/or by the further application.

In further preferred embodiments of the present invention, provision is made that at least one step of the method is performed by the first and/or by the further application, in particular on an application level (user level).

Further preferred embodiments of the present invention include an example apparatus for controlling at least one computing device that is embodied for execution of a first and of at least one further application, at least the first application encompassing at least one anytime algorithm, the apparatus being embodied to perform the method for managing computing performance in a data processing system, in particular in a real-time data processing system, according to the example embodiments of the present invention.

In further preferred embodiments of the present invention, the apparatus has at least one computing device ("computer") that can have associated with it, for example, a storage device in particular for at least temporary storage of at least one computer program and/or of data, in particular data to be processed by way of the apparatus. Also preferably, a computer program for at least temporary control of an operation of the apparatus, in particular for performing the example method according to the example embodiments of the present invention, can be stored in the storage device.

In further preferred embodiments of the present invention, the computing device has at least one of the following elements: a microprocessor; a microcontroller; a digital signal processor (DSP); a programmable logic module (e.g., field programmable gate array, FPGA); an application-specific integrated circuit (ASIC); a hardware circuit. In further preferred embodiments of the present invention, combinations thereof are also possible.

In further preferred embodiments of the present invention, the storage device encompasses at least one of the following elements: a volatile memory, in particular a working memory (RAM); a nonvolatile memory, in particular a flash memory, e.g., flash EEPROM or NOR flash or NAND flash.

In further preferred embodiments of the present invention, provision is made that the apparatus encompasses a computing device that is embodied for execution of a first and of at least one further application, at least the first application encompassing at least one anytime algorithm.

Further preferred embodiments of the present invention include an example data processing system, in particular a real-time data processing system, having at least one apparatus according to the embodiments for controlling at least one computing device that is embodied for execution of a first and of at least one further application, at least the first application encompassing at least one anytime algorithm, the data processing system being embodied for execution of the method for managing computing performance according to the example embodiments of the present invention.

Further preferred embodiments of the present invention include an example computer program product, in particular a portable computer program product, having program code that is suitable for execution on a computer, in particular on a computing device of a computer, a method according to the example embodiments pf the present invention being performed upon execution of the program code.

Further preferred embodiments of the present invention include an example use of a method according to the example embodiments of the present invention and/or of an apparatus according to the embodiments and/or of the data processing system according to the embodiments and/or of the computer program product according to the embodiments for management of available computing performance, in particular for distribution of available computer performance to, in particular unexecuted, applications of a data processing system, in particular of a real-time data processing system.

Further features, potential applications, and advantages of the present invention are evident from the description below of exemplifying embodiments of the present invention which are depicted in the Figures. All features described or depicted in that context, individually or in any combination, constitute the subject matter of the invention, regardless of their grouping in the description, and regardless of their respective presentation or depiction in the description or in the Figures.

DETAILED DESCRIPTION OF EXAMPLE EMBODIMENTS

Figure 1:
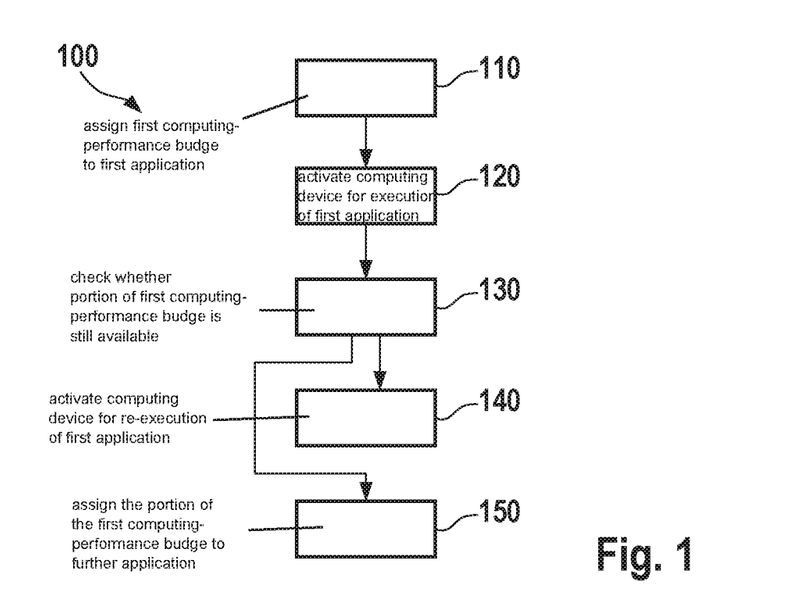
FIG. 1 is a simplified schematic flow chart of a method according to preferred embodiments of the present invention.

Preferred embodiments of the present invention include an example method 100 for managing computing performance in a data processing system, in particular in a real-time data processing system, which is described below with reference to the simplified flow chart according to FIG. 1. Apparatus 200 that is usable in the context of method 100 for controlling at least one computing device 300, which is embodied to execute a first and at least one further application PRG-1, PRG-N, at least first application PRG-1 encompassing at least one anytime algorithm, is depicted schematically in FIGS. 5 and 6. The data processing system is depicted schematically in FIGS. 5, 6, and 7.

Figure 5:
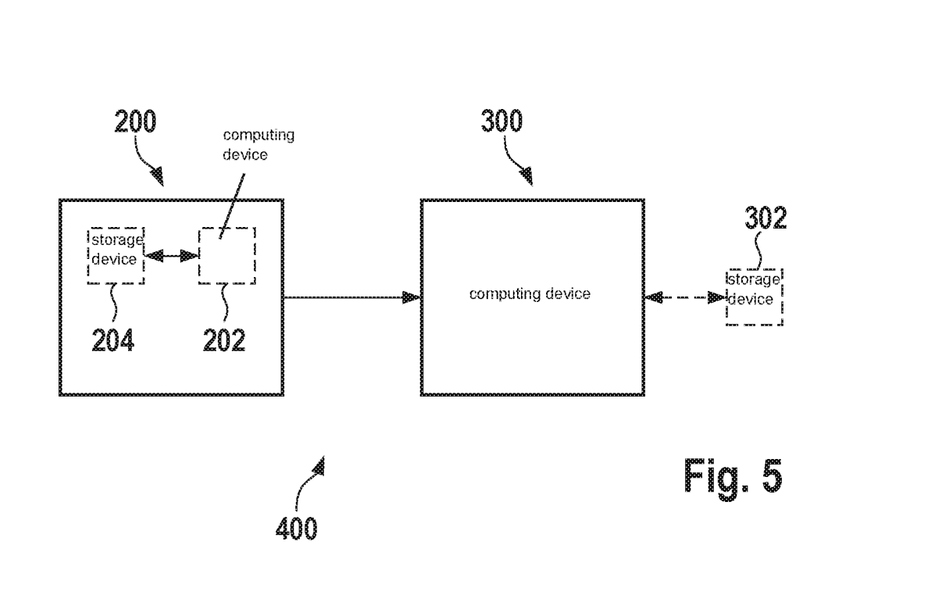
FIG. 5 is a schematic block diagram of a data processing system according to preferred embodiments of the present invention.
Figure 6:
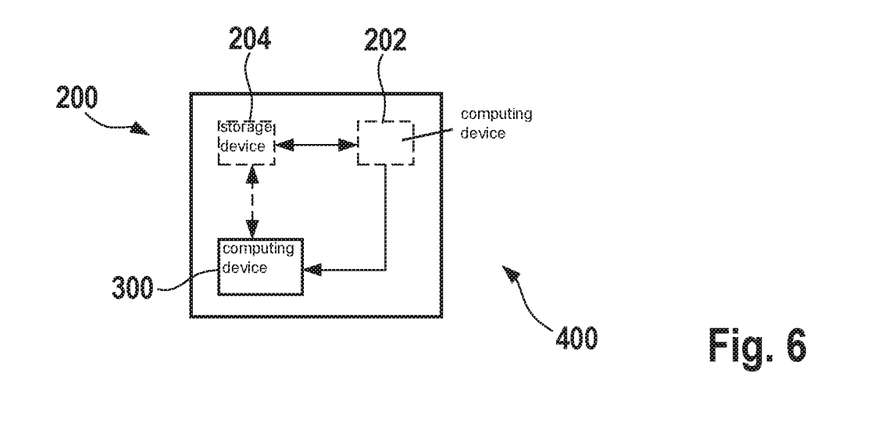
FIG. 6 is a schematic block diagram of a data processing system according to further preferred embodiments of the present invention.

Apparatus 200 has a computing device 202 that can have associated with it, for example, a storage device 204, in particular for at least temporary storage of at least one computer program PRG and/or of data, in particular data to be processed by way of computing device 202. Also preferably, a computer program PRG for at least temporary control of an operation of apparatus 200, in particular for execution of the method according to the embodiments, can be stored in storage device 204.

In further preferred embodiments of the present invention, computing device 202 has at least one of the following elements: a microprocessor; a microcontroller; a digital signal processor (DSP); a programmable logic module (e.g. field programmable gate array, FPGA); an application-specific integrated circuit (ASIC); a hardware circuit. In further preferred embodiments, combinations thereof are also possible. Computing device 202 will also be referred to hereinafter as a "computer."

In further preferred embodiments of the present invention, storage device 204 encompasses at least one of the following elements: a volatile memory, in particular a working memory (RAM); a nonvolatile memory, in particular a flash memory, e.g. flash EEPROM or NOR flash or NAND flash.

In further preferred embodiments of the present invention, apparatus 200 is embodied to control computing device 300 that that is embodied to execute a first and at least one further application PRG-1; PRG-N, at least first application PRG-1 encompassing at least one anytime algorithm, apparatus 200 being embodied to perform the method for managing computing performance in a data processing system, in particular in a real-time data processing system, according to the example embodiments of the present invention.

In further preferred embodiments of the present invention, provision is made that apparatus 200 encompasses computing device 300 that is embodied to execute a first and at least one further application PRG-1; PRG-N, at least first application PRG-1 encompassing at least one anytime algorithm (see FIG. 6).

In further preferred embodiments of the present invention, computing device 300 has at least one of the following elements: a microprocessor; a microcontroller; a digital signal processor (DSP); a programmable logic module (e.g. field programmable gate array, FPGA); an application-specific integrated circuit (ASIC); a hardware circuit. In further preferred embodiments, combinations thereof are also possible.

In further preferred embodiments of the present invention, computing device 300 has associated with it a storage device 302, in particular for at least temporary storage of at least application PRG-1 and/or PRG-N to be executed by computing device 300 and/or of data, in particular data to be processed by way of computing device 302.

In further preferred embodiments of the present invention, storage device 302 encompasses at least one of the following elements: a volatile memory, in particular a working memory (RAM); a nonvolatile memory, in particular a flash memory, e.g. flash EEPROM or NOR flash or NAND flash.

Further preferred embodiments of the present invention include an example data processing system 400, in particular a real-time data processing system, having at least one apparatus 200 according to the embodiments for controlling at least one computing device 300 that is embodied for execution of a first and of at least one further application PRG-1; PRG-N, at least first application PRG-1 encompassing at least one anytime algorithm, data processing system 400 being embodied for execution of method 100 for managing computing performance according to the example embodiments of the present invention (see FIGS. 5, 6).

Further preferred embodiments of the present invention include an example computer program product PRG, in particular a portable computer program product, having program code that is suitable for execution on a computer 202, in particular on a computing device 202 of a computer 202, a method 100 according to the example embodiments being performed upon execution of the program code.

In further preferred embodiments of the present invention, method 100 is realizable, for instance, as a computer-implemented method and has the following steps (see FIG. 1): assigning 110 a first computing-performance budget B-1, as a function of a first point in time T-1, to first application PRG-1; activating 120 computing device 300 for execution of first application PRG-1, in particular of the anytime algorithm of first application PRG-1, at first point in time T-1 by the computing device; checking 130 whether, after execution of first application PRG-1, a portion of first computing-performance budget B-1 is still available and, in the event a portion of budget B-1 is still available, performing one of the following steps: activating 140 computing device 300 for re-execution of first application PRG-1, in particular of the anytime algorithm of first application PRG-1; or assigning 150 the portion of first computing-performance budget B-1 to at least one further application PRG-N. It is thereby advantageously possible to prevent a portion of a computing-performance budget B-1 assigned to an application PRG-1 from remaining unused. That portion of budget B-1 which is still available after the execution of application PRG-1 either is used to execute application PRG-1 again or is assigned to a further application PRG-N.

An "anytime" algorithm has the property of being able to supply a result at any time, especially after being executed at least once. The time available is not necessarily known to the algorithm; it calculates an initial result, and improves it as long as additional computing time, in particular a sufficient computing-performance budget, is available. If execution is interrupted, the algorithm returns the best result that was obtained up to that point in time. Advantageously, method 100 makes it possible for available computing performance to be used, by re-execution of an anytime algorithm, to improve the quality of service (QoS) of the anytime algorithm.

In further preferred embodiments of the present invention, the assigning of first computing-performance budget B-1, as a function of a first point in time T-1, to first application PRG-1 is accomplished in consideration of a time duration and/or of a deadline within which and/or by which application PRG-1 is, in particular successfully, executed and/or at least the result of application PRG-1 exhibits a specific quality.

Figure 2:
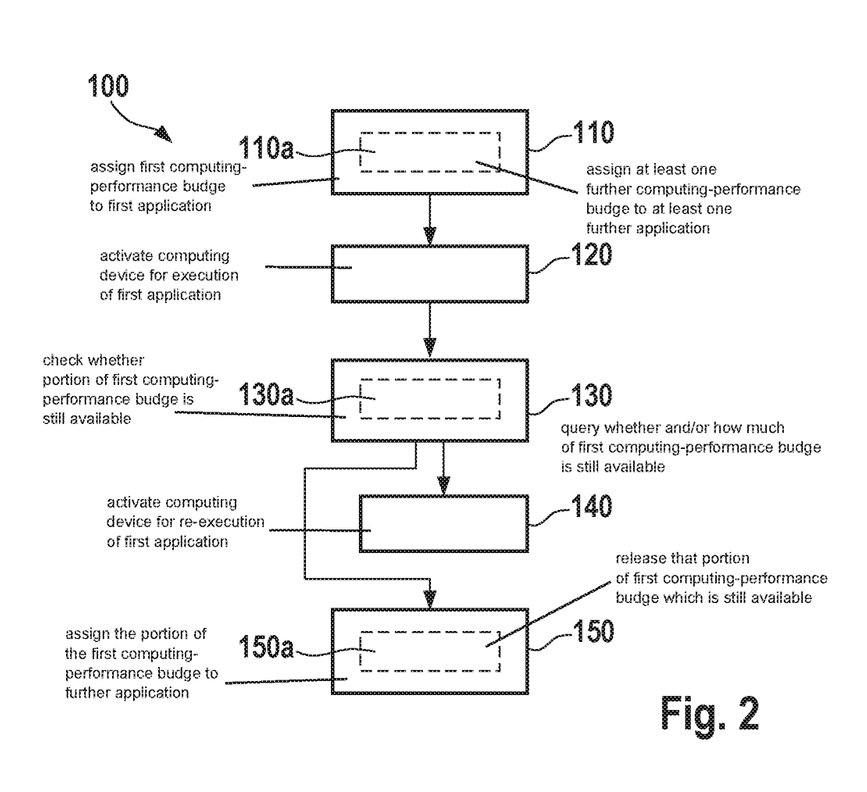
FIG. 2 is a simplified schematic flow chart of a method according to further preferred embodiments of the present invention.

In further preferred embodiments of the present invention, the step of assigning 150 the portion of first computing-performance budget B-1 to a further application PRG-N further encompasses: releasing 150a that portion of first computing-performance budget B-1 which is still available after execution of first application PRG-1 (FIG. 2). The releasing 150a, in particular by first application PRG-1, of the still-available portion of first budget B-1 advantageously makes it possible for that portion of budget B-1 to be assigned to a further application.

In further preferred embodiments of the present invention, the step of checking 130 whether, after execution of first application PRG-1, a portion of first computing-performance budget B-1 is still available further encompasses: querying 130a whether and/or how much of first computing-performance budget B-1 is still available (FIG. 2).

In further preferred embodiments of the present invention, the checking 130 and/or querying 130a encompasses whether and/or how much of first computing-performance budget B1 is still available by a point in time in the future, in particular by the deadline by which application PRG-1 has been, in particular successfully, executed and/or at least the result of application PRG-1 exhibits a specific quality.

The step of checking 130 and/or querying 130a is advantageously accomplished by first application PRG-1.

In further preferred embodiments of the present invention, provision is made that activation 140 of computing device 300 for re-execution of first application PRG-1, in particular of the anytime algorithm of first application PRG-1, is accomplished depending on the still-available portion of first computing-performance budget B-1 and/or depending on a quality of a result of first application PRG-1, in particular of the anytime algorithm of first application PRG-1; and activation 140 of computing device 300 for re-execution is accomplished in particular if the still-available portion of first computing-performance budget B-1 is sufficient to re-perform first application PRG-1, in particular the anytime algorithm of first application PRG-1, and/or if the quality of the result of first application PRG-1, in particular of the anytime algorithm of first application PRG-1, has not yet reached a threshold value.

A "threshold value" in this connection is advantageously a value upon attainment and/or exceedance of which the quality of the result of application PRG-1 is at least sufficient to ensure a functionality of application PRG-1.

In further preferred embodiments of the present invention, provision is made that the step of assigning 150 the portion of first computing-performance budget B-1 to a further application PRG-N, and/or the step of releasing 150a that portion of first computing-performance budget B-1 which is still available after execution of first application PRG-1, is accomplished depending on a quality of a result of first application PRG-1, in particular of the anytime algorithm of first application PRG-1, and/or depending on the still-available portion of first computing-performance budget B-1; and the assigning 150 and/or releasing 150a is accomplished in particular if the quality of the result of first application PRG-1, in particular of the anytime algorithm of first application PRG-1, has reached or exceeded a threshold value, and/or if the still-available portion of first computing-performance budget B-1 is not sufficient to re-perform first application PRG-1, in particular the anytime algorithm of first application PRG-1.

In further preferred embodiments of the present invention, provision is made that the step of assigning 110 first computing-performance budget B-1, as a function of the first point in time, to first application PRG-1 further encompasses: assigning 110a at least one further computing-performance budget B-N, as a function of a further point in time T-N, to at least one further application PRG-N, the assigning step 110, 110a being, in particular periodically, repeated (FIG. 2).

Advantageously, the assigning of computing-performance budgets B-1, B-N to application(s) PRG-1; PRG-N is repeated periodically, in consideration of time duration(s) and/or deadline(s) within which and/or by which application(s) PRG-1, PRG-N is, in particular successfully, executed and/or at least the result of application(s) PRG-1; PRG-N exhibits a specific quality.

Advantageously, by execution of the steps of method 100 recited above, in particular checking 130, querying 130a, assigning 150, and/or releasing 150a, available computing performance can be assigned, in particular redistributed, to further application PRG-N. Advantageously, further application PRG-N can thereby be executed even before point in time T-N, i.e. earlier than provided by assigning budget B-N as a function of point in time T-N.

In further preferred embodiments of the present invention, provision is made that the step of assigning 110 first computing-performance budget B-1 and/or further computing-performance budget B-N, as a function of a first and/or of a further point in time T-1; T-N, to first and/or to further application PRG-1; PRG-N is accomplished using at least one scheduling algorithm, in particular a reservation-based scheduling algorithm, a capacity sharing (CASH) algorithm, a priority-based scheduling algorithm, a time-based scheduling algorithm.

Figure 7:
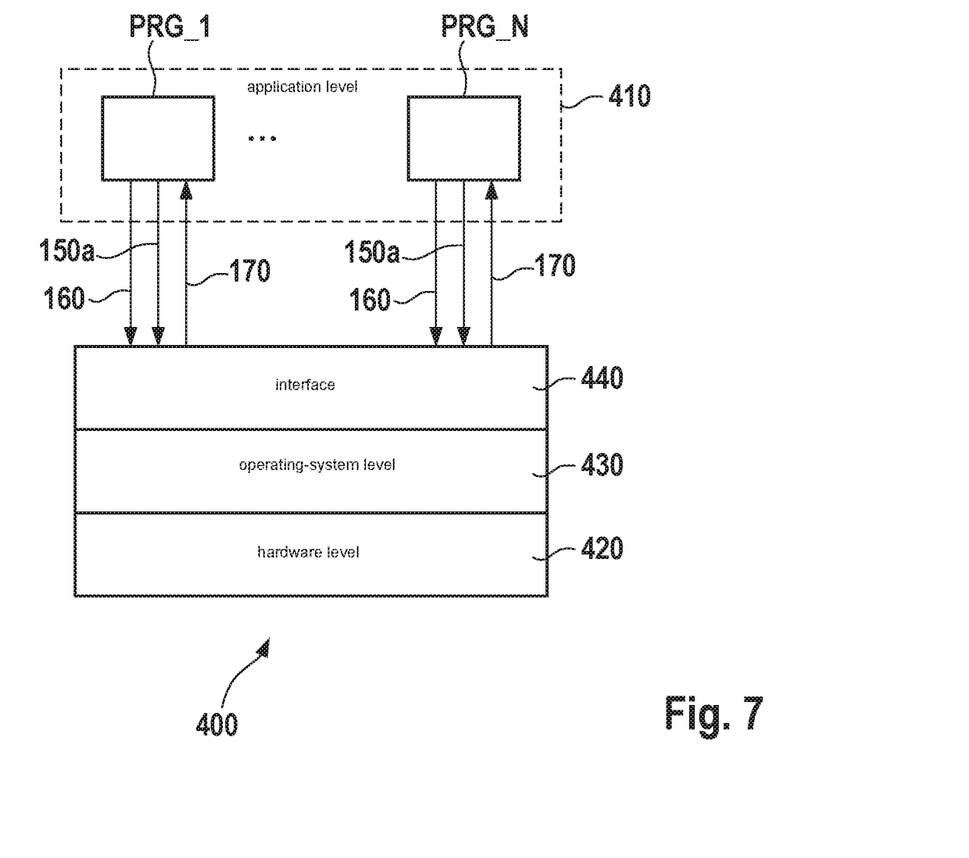
FIG. 7 is a schematic view of a data processing system constituting a layer model, according to preferred embodiments of the present invention.

The execution of scheduling mechanisms advantageously occurs on an operating-system level 430 (see FIG. 7).

Figure 3:
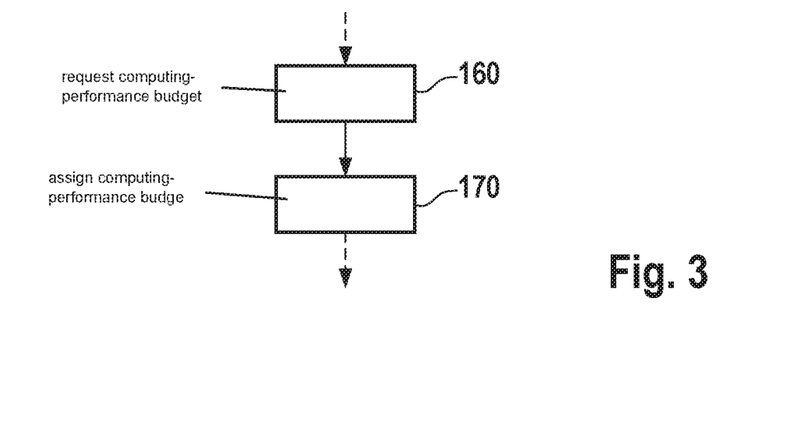
FIG. 3 is a simplified schematic flow chart of portions of a method according to further preferred embodiments of the present invention.

In further preferred embodiments of the present invention, provision is made that the method further encompasses: a requesting 160 of computing performance, in particular computing-performance budget B, by an application PRG-1; PRG-N (FIG. 3).

Advantageously, the requesting 160 of computing performance by application PRG-1 is accomplished in particular when the still-available portion of first computing-performance budget B-1 is not sufficient to re-perform first application PRG-1, in particular the anytime algorithm of first application PRG-1, and/or if the quality of the result of first application PRG-1, in particular of the anytime algorithm of first application PRG-1, has not yet reached a threshold value.

In further preferred embodiments of the present invention, provision is made that requesting 160 of computing performance by an application PRG-1; PRG-N is accomplished at a point in time at which application PRG-1; PRG-N is not executed.

In further preferred embodiments of the present invention, provision is made that the method further encompasses: assigning 170 computing-performance budget B to application PRG-1; PRG-N that has requested 160 computing performance if computing performance is available, in particular is not assigned to a further application PRG-1; PRG-N. Advantageously, an application PRG-1; PRG-N that is currently being/has been executed is re-executed, in particular in order to increase the quality of the result. Advantageously, an application PRG-1; PRG-N that is not currently being or has not just been executed can be executed even before point in time T-1, T-N, i.e. earlier than provided by assigning budget B-N as a function of point in time T-1, T-N.

Figure 4:
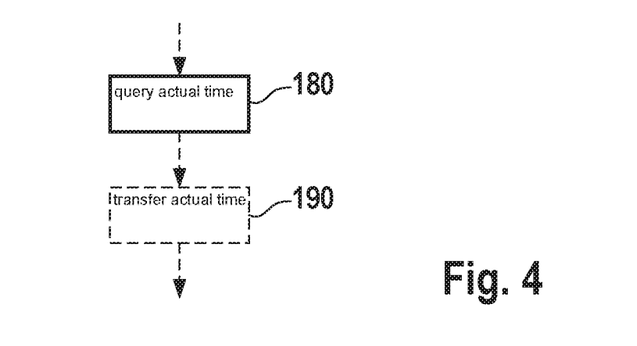
FIG. 4 is a simplified schematic flow chart of portions of a method according to further preferred embodiments of the present invention.

In further preferred embodiments of the present invention, provision is made that the method further encompasses: a querying 180 of an actual time by an application PRG-1; PRG-N and/or a transferring 190 of an actual time to an application PRG-1; PRG-N (FIG. 4). Advantageously, an application PRG-1, PRG-N can determine based on the actual time, for example, how much time remains until the quality of the result of the application must have reached and/or exceeded a specific threshold value. Advantageously, an application PRG-1, PRG-N can determine based on the actual time, for example, whether enough time remains to re-execute the application. Depending on that, for example, the steps recited above of assigning 150, releasing 150*a*, activating 140 computing device 300 for re-execution can be performed.

In further preferred embodiments of the present invention, provision is made that at least one step of method 100 is performed by first and/or by further application PRG-1; PRG-N, in particular on an application level 410 (user level). Advantageously, in particular the steps of querying 130*a*, releasing 150*a*, requesting 160, querying 180 of an actual time are performed by application PRG-1; PRG-N. Advantageously, the performance of these steps is accomplished on an application level (user level) (see FIG. 7). FIG. 7 is a schematic view of data processing system 400 as a layer model.

The lowest level (layer) of data processing system 400 is hardware level 420. Located thereabove is operating-system level 430. On the operating-system level, for example, resources, for example memory resources, in particular working memories, of the data processing system are managed and are made available to applications PRG-1; PRG-N.

In further preferred embodiments of the present invention, provision is made that the step of assigning 110 first computing-performance budget B-1 and/or further computing-performance budget B-N, as a function of first and/or of further point in time T-1; T-N, to first and/or to further application PRG-1; PRG-N is accomplished on operating-system level 430 using at least one scheduling algorithm, in particular a reservation-based scheduling algorithm, a capacity sharing (CASH) algorithm, a priority-based scheduling algorithm, a time-based scheduling algorithm.

According to the example embodiment shown, the linkage of application level 410 to operating-system level 430 is accomplished via an interface 440. Interface 440 is advantageously a portable interface 440, and thus supports compatibility between application level 410 and operating-system level 430 as well as the portability of applications PRG-1; PRG-N. In particular, the activation of computing device 300 for execution of applications PRG-1, PRG-N, in particular at points in time T-1; T-N, can be accomplished via interface 440.

Interface 440 advantageously furnishes the computer program functions, described later in detail in tables 1 to 4, of computer program PRG. Advantageously, these computer program functions can be called by applications PRG-1; PRG-N. Advantageously, one or several steps of method 100 described above are performed when the computer program functions are called.

For example, via interface 440, operating-system level 430 located therebelow can be informed when an application PRG-1; PRG-N releases a portion of its budget B-1; B-N. The released budget can then be taken into consideration upon the next periodic assigning 110 of first computing-performance budget B-1 and/or of further computing-performance budget B-N, as a function of first and/or of further point in time T-1; T-N, to first and/or to further application PRG-1; PRG-N.

By way of these computer program functions, interface 440 advantageously coordinates the management of computing performance in data processing system 400 between application level 410 and operating-system level 430 located therebelow.

Advantageously, interface 440 is part of an integration platform or encompasses an integration platform for linking (incorporating) applications PRG-1; PRG-N into data processing system 400.

A suitable interface (not shown in FIG. 7) can advantageously be disposed between hardware level 420 and operating-system level 430.

Further preferred embodiments of the present invention include a use of a method 100 according to the embodiments and/or of an apparatus 200 according to the embodiments and/or of the data processing system 400 according to the embodiments and/or of the computer program product PRG according to the embodiments for management of available computing performance, in particular for distribution of available computer performance to, in particular unexecuted, applications PRG-1; PRG-N of a data processing system 400, in particular of a real-time data processing system.

In further preferred embodiments of the present invention, method 100 and/or apparatus 200 and/or data processing system 400 according to the example embodiments can be used in a control device, e.g., a control device for a motor vehicle, in particular a control device for an internal combustion engine of a motor vehicle.

In further preferred embodiments of the present invention, the method and/or the apparatus according to the embodiments can be used in a control device, for instance a control device for a motor vehicle, in particular a control device for an internal combustion engine of a motor vehicle, in particular the first and/or the further application, and/or the anytime algorithm of the first application, furnishing, for instance, at least one of the following applications and/or at least one function for at least one of the following applications: a) controlling an operation or operating state transition of the control device; b) enabling or not enabling one or several functions of the control device and/or of another component and/or, for instance, of the motor vehicle; c) activating an actuating member.

Aspects of further preferred embodiments of the present invention are set forth below in table form, each table having a first (left) column that encompasses a natural number greater than zero which defines a program code line, and at least one further (right) column that is separated from the first column by a space and encompasses program code of a computer code PRG or comments; and Table 1 having exemplifying declarations of program functions of computer program PRG; Table 2 characterizing, by way of example, a program function for re-execution of an application; Table 3 characterizing, by way of example, a further program function for re-execution of an application; and Table 4 characterizing, by way of example, a program function for executing an application or, alternatively, a fallback application.

[---begin Table 1---]
```
    1    /*declaration of program functions*/
    2    getTime ( )
    3    availableRes (time)
    4    waitForRes (chunk, time)
    5    yieldRes ( )
```
[---end Table 1---]
[---begin Table 2---]
```
    6    /*re-execute as long as computing performance is available */
    7    time = PRIA.getTime ( );
    8    while PRIA.waitForRes (resForOneInteration, time + deadline)
    9    {
   10        result = Perform_AnyTimeAlgo_Iteration ( );
   11    }
```
[---end Table 2---]
[---begin Table 3---]
```
   12    /*re-execute until quality reached*/
   13    time - PRIA.getTime ( );
```

-continued

```
14    while PRIA.waitForRes (resForOneIteration, time + deadline)
15    {
16       result = Perform_AnyTimeAlgo_Iteration ( );
17       quality = Eval_Result_Quality (result);
18       if (quality > threshold)
19       {
20          PRIA.yieldRes ( );
21          break;
22       }
23    }
```
[---end table 3---]
[---begin Table 4---]
```
24    /*execute complex algorithm or fallback algorithm*/
25    time = PRIA.getTime ( )
26    availableRes = PRIA.availableRes (time + deadline);
27    if availableRes >= complexAlgoResRequirement then
28       result = executeComplexAlgo ( );
29    else if availableRes >= minResRequirement then
30       result = executeFallbackAlgo ( );
31    else goToErrorMode ( );
```
[---end Table 4---]

A detailed description is given below of the program functions, set forth above in table form, according to further preferred embodiments.

The getTime function (line 2 of Table 1) serves to query a time. It thus approximately corresponds to or enables querying 180 of the actual time.

The availableRes function (line 3 of Table 1) serves to query available computing performance, and thus approximately corresponds to or enables querying 130a as to whether and/or how much of first computing-performance budget B-1 is still available.

The waitForRes function (line 4 of Table 1) waits until the computing-performance budget is replenished. When enough budget B is present, the application is immediately (re-)executed. Otherwise budget B can, for example in the context of a reservation-based scheduling method, be replenished in a periodic replenishment or if another application has released budget. The waitForRes function thus allows requesting 160 of computing performance, in particular computing-performance budget B, by an application PRG-1; PRG-N.

The yieldRes function (line 5 of Table 1) serves to release computing performance. It thus approximately corresponds to or enables releasing 150a of a portion of computing-performance budget B-1 by an application PRG-1; PRG-N.

Table 2 shows an exemplifying application of the waitForRes function according to a preferred embodiment. For that purpose, the executed application, for example PRG-1, has the actual time transferred to it. The executed application requests further computing-performance budget and executes the anytime algorithm until the point in time at which the result must be available (deadline). According to the embodiment presented, it is assumed that one ms of computation time is necessary for one iteration of the anytime algorithm "resForOneIteration."

Table 3 presents a further exemplifying application of the waitForRes function according to a further preferred embodiment of the present invention. The executed application requests further computing-performance budget and executes the anytime algorithm until the point in time at which a specific (application-dependent) "quality" is achieved, in particular until the quality of the result of the first application, in particular of the anytime algorithm of the first application, has reached or exceeded a threshold value. When the threshold value has been reached or exceeded, execution of the anytime algorithm is stopped and the remaining resources are, in particular the remaining computing-performance budget is, released. Advantageously, the released budget is then assigned to a further application (not shown).

Table 4 presents an exemplifying application of the availableRes function according to a preferred embodiment. Depending on the available resources, the application selects a suitable algorithm and executes it in order to provide the requisite functionality. For the case in which sufficient computing-performance budget (computing resources) is/are available, a complex algorithm (ComplexAlgo) is performed. A complex algorithm requires, in particular, a comparatively large amount of computing performance and supplies (almost) optimal results. If sufficient budget for executing a complex algorithm is not available, but the computing performance is still sufficient to provide an at least required functionality, a fallback algorithm, for example, is executed. Otherwise the application switches into an error mode.

In further preferred embodiments of the present invention, if the still-available portion of first computing-performance budget B-1 is not sufficient to perform, in particular to re-perform, first application PRG-1, in particular the anytime algorithm of first application PRG-1, provision is made to activate computing device 300 to execute a fallback algorithm. A fallback algorithm is, for example, an algorithm that requires comparatively little computing performance but yields a result that can afford at minimum an at least necessary functionality of the application.

In further preferred embodiments of the present invention, if the still-available portion of a first computing-performance budget B-1 is not sufficient to perform, in particular to re-perform, first application PRG-1, in particular the anytime algorithm of first application PRG-1, and/or is not sufficient to perform a fallback algorithm, provision is made that first application PRG-1 transitions into an error state.

In further preferred embodiments of the present invention, method 100 and/or apparatus 200 according to the embodiments can be used in a control device, e.g., a control device for a motor vehicle, in particular a control device for an internal combustion engine of a motor vehicle, and/or in a control device for performing functions for automated driving and/or for performing driver assistance functions, for example video- or radar-based functions, in particular first and/or further application PRG-1; PRG-N, and/or the anytime algorithm of first application PRG-1, for instance, furnishing at least one of the following applications and/or at least one function for at least one of the following applications: a) controlling an operation or operating state transition of the control device; b) releasing or not releasing one or several functions of the control device and/or of another component and/or, for instance, of the motor vehicle; c) activating an actuating member.

What is claimed is:

1. A method for managing computing performance in a real-time data processing system, having at least one apparatus for controlling at least one computing device that is embodied for execution of a first application and of at least one further application, at least the first application encompassing at least one anytime algorithm, the method comprising the following steps:
   assigning a first computing-performance budget, as a function of a first point in time, to the first application;
   activating the computing device to execute the anytime algorithm of the first application at the first point in time by the computing device; and checking whether, after execution of the first application, and depending on a quality of a result of the anytime algorithm of the first application, a portion of the first computing-performance budget is still available and, based on the portion of the budget still being available, performing one of the following steps:
activating the computing device to re-execute the anytime algorithm of the first application; or
assigning the portion of the first computing-performance budget to the at least one further application.

2. The method as recited in claim 1, wherein the step of assigning the portion of the first computing-performance budget to the at least one further application includes releasing that portion of the first computing-performance budget which is still available after execution of the first application.

3. The method as recited in claim 1, wherein the step of checking whether, after the execution of the first application, a portion of the first computing-performance budget is still available includes querying whether and/or how much of the first computing-performance budget is still available.

4. The method as recited in claim 1, wherein the activation of the computing device to re-execute the anytime algorithm of the first application is accomplished depending on a still-available portion of the first computing-performance budget and/or depending on a quality of a result of the anytime algorithm of the first application, and wherein the activation of the computing device to re-execute the anytime algorithm of the first application is accomplished when the still-available portion of the first computing-performance budget is sufficient to re-perform the anytime algorithm of the first application, and/or when the quality of the result of the anytime algorithm of the first application has not yet reached a threshold value.

5. The method as recited in claim 2, wherein the step of assigning the portion of the first computing-performance budget to the at least one further application, and/or the step of releasing that portion of the first computing-performance budget which is still available after execution of the first application, is accomplished depending on a quality of a result of the anytime algorithm of the first application, and/or depending on the still-available portion of the first computing-performance budget, and wherein the assigning and/or releasing is accomplished when the quality of the result of the anytime algorithm of the first application has reached or exceeded a threshold value, and/or when the still-available portion of the first computing-performance budget is not sufficient to re-perform the anytime algorithm of the first application.

6. The method as recited in claim 1, wherein the step of assigning the first computing-performance budget, as a function of the first point in time, to the first application includes assigning at least one further computing-performance budget, as a function of a further point in time, to at least one further application, the assigning step being periodically repeated.

7. The method as recited in claim 6, wherein the step of assigning the first computing-performance budget and/or the further computing-performance budget, as a function of a first and/or of the further point in time, to the first application and/or to the further application, is accomplished using at least one scheduling algorithm, the at least one scheduling algorithm including a reservation-based scheduling algorithm, or a priority-based scheduling algorithm, or a time-based scheduling algorithm.

8. The method as recited in claim 1, further comprising the following step:
requesting computing-performance budget by an application.

9. The method as recited in claim 8, further comprising the following step:
assigning computing-performance budget to the application that has requested computing performance when computing performance is available and is not assigned to a further application.

10. The method as recited in claim 1, further comprising the following step:
querying of an actual time by an application and/or transferring an actual time to an application.

11. The method as recited in claim 1, wherein at least one step of the method is performed by the first application and/or by the further application.

12. An apparatus for controlling at least one computing device that is configured for execution of a first application and of at least one further application, at least the first application encompassing at least one anytime algorithm, the apparatus configured to manage computing performance in a real-time data processing system, the apparatus configured to:
assign a first computing-performance budget, as a function of a first point in time, to the first application;
activate the computing device to execute the anytime algorithm of the first application at the first point in time by the computing device; and
check whether, after execution of the first application, and depending on a quality of a result of the anytime algorithm of the first application, a portion of the first computing-performance budget is still available and, based on the portion of the budget still being available:
activate the computing device to re-execute the anytime algorithm of the first application; or
assign the portion of the first computing-performance budget to the at least one further application.

13. The apparatus as recited in claim 12, wherein the apparatus includes a computing device that is configured for execution of the first application and of the at least one further application.

14. A real-time data processing system, comprising:
at least one apparatus configured to control at least one computing device that is embodied for execution of a first application and of at least one further application, at least the first application encompassing at least one anytime algorithm;
wherein the data processing system is configured to:
assign a first computing-performance budget, as a function of a first point in time, to the first application;
activate the computing device to execute the anytime algorithm of the first application at the first point in time by the computing device; and
check whether, after execution of the first application, and depending on a quality of a result of the anytime algorithm of the first application, a portion of the first computing-performance budget is still available and, based on the portion of the budget still being available:
activate the computing device to re-execute the anytime algorithm of the first application; or
assign the portion of the first computing-performance budget to the at least one further application.

15. A non-transitory portable computer program product on which is stored program code that is suitable for execution on a computer, the program code for managing computing performance in a real-time data processing system, having at least one apparatus for controlling at least one computing device that is embodied for execution of a first application and of at least one further application, at least the first application encompassing at least one anytime algorithm, the program code, when executed by the computer, causing the computer to perform the following steps:

assigning a first computing-performance budget, as a function of a first point in time, to the first application;

activating the computing device to execute the anytime algorithm of the first application at the first point in time by the computing device; and checking whether, after execution of the first application, and depending on a quality of a result of the anytime algorithm of the first application, a portion of the first computing-performance budget is still available and, based on the portion of the budget still being available, performing one of the following steps:

activating the computing device to re-execute the anytime algorithm of the first application; or assigning the portion of the first computing-performance budget to the at least one further application.

16. A method, comprising:

providing an apparatus for controlling at least one computing device that is configured for execution of a first application and of at least one further application, at least the first application encompassing at least one anytime algorithm, the apparatus configured to manage computing performance in a real-time data processing system, the apparatus configured to:

assign a first computing-performance budget, as a function of a first point in time, to the first application;

activate the computing device to execute the anytime algorithm of the first application at the first point in time by the computing device; and check whether, after execution of the first application, and depending on a quality of a result of the anytime algorithm of the first application, a portion of the first computing-performance budget is still available and, based on the portion of the budget still being available:

activate the computing device to re-execute the anytime algorithm of the first application; or assign the portion of the first computing-performance budget to the at least one further application; and using the apparatus to manage the computing performance in the real-time data processing system.

* * * * *